(12) United States Patent
Nunez et al.

(10) Patent No.: US 11,702,266 B2
(45) Date of Patent: *Jul. 18, 2023

(54) FITMENT WITH BLEND COMPONENT AND FLEXIBLE CONTAINER WITH SAME

(71) Applicant: Dow Global Technologies LLC, Midland, MI (US)

(72) Inventors: Laura Nunez, Freeport, TX (US); Lamy J. Chopin, III, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 70 days.

This patent is subject to a terminal disclaimer.

(21) Appl. No.: 17/313,722

(22) Filed: May 6, 2021

(65) Prior Publication Data
US 2021/0269214 A1    Sep. 2, 2021

Related U.S. Application Data

(63) Continuation of application No. 16/304,605, filed as application No. PCT/US2017/033252 on May 18, 2017, now Pat. No. 11,027,906.
(Continued)

(51) Int. Cl.
*B65D 75/58* (2006.01)
*B29C 65/18* (2006.01)
(Continued)

(52) U.S. Cl.
CPC .......... *B65D 75/5883* (2013.01); *B29C 65/18* (2013.01); *B29C 66/0242* (2013.01); *B29C 66/112* (2013.01); *B29C 66/114* (2013.01); *B29C 66/53263* (2013.01); *B29C 66/71* (2013.01); *B29C 66/712* (2013.01); *B29C 66/73116* (2013.01); *B29C 66/851* (2013.01); *B32B 3/02* (2013.01); *B32B 7/12* (2013.01);
(Continued)

(58) Field of Classification Search
CPC ............ B65D 75/5872; B65D 75/5877; B65D 75/5883; B65D 75/5861; B65D 75/008; B65D 2575/583
See application file for complete search history.

(56) References Cited

U.S. PATENT DOCUMENTS 4,303,710 A    12/1981 Bullard et al.
4,843,129 A    6/1989 Spenadel et al.
(Continued)

FOREIGN PATENT DOCUMENTS

JP    2000-153852 A    6/2000

*Primary Examiner* — Patrick M. Buechner
(74) *Attorney, Agent, or Firm* — Quarles & Brady LLP

(57) ABSTRACT

The present disclosure provides a fitment. In an embodiment, a fitment is provided and includes a top portion, a base, and a channel extending through the top portion and the base for passage of a flowable material. The fitment is composed of a polymeric composition. The polymeric composition includes (i) from 70 to 90 weight percent of a high density polyethylene (HDPE) having a density from 0.940 g/cc to 0.970 g/cc, a melt temperature, Tm, greater than 125° C., and a melt index from 1 g/10 min to 50 g/10 min; and (ii) from 30 to 10 weight percent of an olefin-based elastomer having a density from 0.860 g/cc to 0.905 g/cc, a melt index from 0.2 g/10 min to 50 g/10 min, and a Tm less than 125° C.

16 Claims, 6 Drawing Sheets

Related U.S. Application Data

(60) Provisional application No. 62/342,235, filed on May 27, 2016.

(51) Int. Cl.

| | | |
|---|---|---|
| *B29C 65/00* | (2006.01) | |
| *C08L 23/06* | (2006.01) | |
| *B32B 27/30* | (2006.01) | |
| *B32B 27/32* | (2006.01) | |
| *C08L 23/14* | (2006.01) | |
| *C08L 23/08* | (2006.01) | |
| *B32B 15/085* | (2006.01) | |
| *B32B 3/02* | (2006.01) | |
| *B65B 61/18* | (2006.01) | |
| *B32B 15/08* | (2006.01) | |
| *B32B 27/08* | (2006.01) | |
| *B32B 27/18* | (2006.01) | |
| *B32B 27/20* | (2006.01) | |
| *B32B 15/09* | (2006.01) | |
| *B32B 15/088* | (2006.01) | |
| *B32B 7/12* | (2006.01) | |
| *C08L 53/00* | (2006.01) | |
| *B32B 27/34* | (2006.01) | |
| *B65D 75/00* | (2006.01) | |
| *B32B 27/36* | (2006.01) | |
| *B29K 623/00* | (2006.01) | |
| *B29L 31/00* | (2006.01) | |
| *B29C 65/82* | (2006.01) | |
| *B29C 65/78* | (2006.01) | |

(52) U.S. Cl.
CPC .......... *B32B 15/08* (2013.01); *B32B 15/085* (2013.01); *B32B 15/088* (2013.01); *B32B 15/09* (2013.01); *B32B 27/08* (2013.01); *B32B 27/18* (2013.01); *B32B 27/20* (2013.01); *B32B 27/306* (2013.01); *B32B 27/308* (2013.01); *B32B 27/32* (2013.01); *B32B 27/34* (2013.01); *B32B 27/36* (2013.01); *B65B 61/186* (2013.01); *B65D 75/008* (2013.01); *C08L 23/06* (2013.01); *C08L 23/0815* (2013.01); *C08L 23/14* (2013.01); *C08L 53/00* (2013.01); *B29C 65/7847* (2013.01); *B29C 65/8246* (2013.01); *B29C 66/0342* (2013.01); *B29C 66/1122* (2013.01); *B29C 66/8322* (2013.01); *B29C 66/919* (2013.01); *B29K 2623/065* (2013.01); *B29L 2031/7128* (2013.01); *B32B 2255/10* (2013.01); *B32B 2255/205* (2013.01); *B32B 2307/31* (2013.01); *B32B 2307/40* (2013.01); *B32B 2307/4026* (2013.01); *B32B 2307/516* (2013.01); *B32B 2307/518* (2013.01); *B32B 2307/546* (2013.01); *B32B 2307/714* (2013.01); *B32B 2307/7242* (2013.01); *B32B 2307/746* (2013.01); *B32B 2439/06* (2013.01); *C08L 2205/02* (2013.01); *C08L 2205/025* (2013.01); *C08L 2205/03* (2013.01); *C08L 2207/02* (2013.01); *C08L 2207/062* (2013.01)

(56) References Cited

U.S. PATENT DOCUMENTS

| | | |
|---|---|---|
| 5,177,147 A | 1/1993 | Spenadel et al. |
| 5,221,028 A | 6/1993 | Dwinell |
| 5,272,236 A | 12/1993 | Lai et al. |
| 5,334,657 A | 8/1994 | Swartzmiller et al. |
| 5,439,124 A | 8/1995 | Mock |
| 5,567,773 A | 10/1996 | McGee et al. |
| 5,783,638 A | 7/1998 | Lai et al. |
| 5,929,128 A | 7/1999 | Whetten et al. |
| 6,362,270 B1 | 3/2002 | Chaudhary et al. |
| 6,395,791 B1 | 5/2002 | Chaudhary et al. |
| 6,854,888 B1 * | 2/2005 | Brown .................. A45F 3/20 383/41 |
| 7,608,668 B2 | 10/2009 | LiPi Shan et al. |
| 7,858,706 B2 | 12/2010 | Arriola et al. |
| 7,893,166 B2 | 2/2011 | LiPi Shan et al. |
| 7,947,793 B2 | 5/2011 | Marchand et al. |
| 8,481,647 B2 | 7/2013 | Jiang |
| 10,071,837 B2 * | 9/2018 | Franca .................. C08F 293/00 |
| 11,027,906 B2 * | 6/2021 | Nunez .................. B32B 27/36 |
| 2005/0263233 A1 | 12/2005 | Meier |
| 2006/0199908 A1 | 9/2006 | Cheung et al. |
| 2008/0274245 A1 | 11/2008 | Lee et al. |
| 2008/0312380 A1 | 12/2008 | Kwalk et al. |
| 2011/0036865 A1 | 2/2011 | Johnson et al. |
| 2011/0178245 A1 | 7/2011 | Peacock |
| 2012/0022214 A1 | 1/2012 | Davis et al. |
| 2012/0130027 A1 | 5/2012 | Standaert et al. |
| 2013/0072632 A1 | 3/2013 | Wang et al. |
| 2013/0184419 A1 | 7/2013 | Berbee et al. |
| 2013/0331496 A1 | 12/2013 | Domoy et al. |
| 2014/0045979 A1 | 2/2014 | Ziegler et al. |
| 2014/0231452 A1 | 8/2014 | James et al. |
| 2015/0158635 A1 | 6/2015 | Gum |

\* cited by examiner

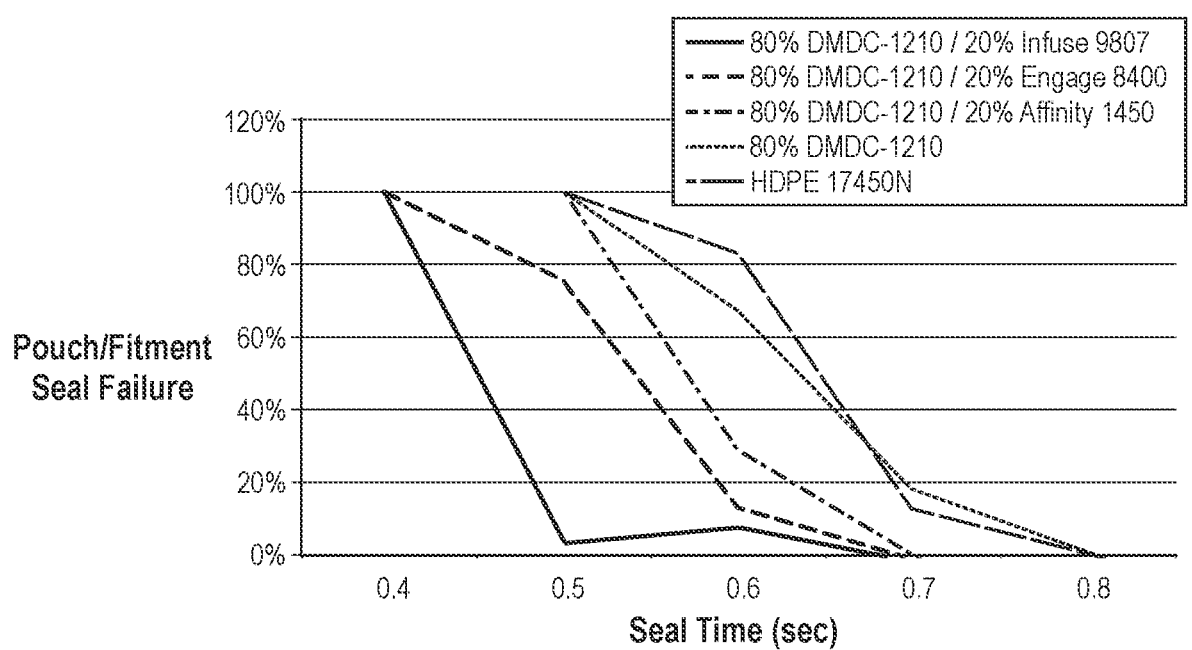

FITMENT WITH BLEND COMPONENT AND FLEXIBLE CONTAINER WITH SAME

BACKGROUND

The present disclosure is directed to fitments for flexible containers.

Known are flexible containers (also known as pouches) with fitments. A fitment is a rigid pour spout for delivery of flowable material from the flexible pouch, the fitment sealed to the pouch. Such pouches are often referred to as "pour-pouches."

The rigid fitment is typically made from a material with a higher melt temperature than the pouch seal layer. During the pouch to fitment assembly process, the film surface and the fitment surface are brought into contact by heat seal bars that impart elevated temperature and elevated pressure to the film-fitment assembly. Rigidity in fitments composed of olefin-based polymer, for example, is typically the result of the olefin-based polymer having a high crystallinity. Olefin-based polymer used in rigid fitments typically has a higher melt temperature than olefin-based polymer used in the seal layer of the pouch. Due to the difference in melt temperature, the pouch seal layer can be overheated and deform, and/or the fitment is underheated. Either situation is problematic because each is an impediment to proper, leak-proof, sealing.

A need exists for polymeric formulations for rigid fitments to improve compatibility and seal adhesion with flexible films for the production of pour pouches while maintaining fitment rigidity. A need further exists for improved fitments to reduce production costs and production time for the production of flexible containers with heat sealed fitments.

SUMMARY

Applicant discovered that addition of an elastomeric material to an ethylene-based fitment exhibits improvement in fitment to pouch sealability. The elastomer/ethylene-based polymer blend reduces the melt temperature of the fitment enabling sealability within a desirable melt window of the pouch sealant layer.

The present disclosure provides a fitment. In an embodiment, a fitment is provided and includes a top portion, a base, and a channel extending through the top portion and the base for passage of a flowable material. The fitment is composed of a polymeric composition. The polymeric composition includes (i) from 70 to 90 weight percent of a high density polyethylene (HDPE) having a density from 0.940 g/cc to 0.970 g/cc, a melt temperature, Tm, greater than 125° C., and a melt index from 1 g/10 min to 50 g/10 min; and (ii) from 30 to 10 weight percent of an olefin-based elastomer having a density from 0.860 g/cc to 0.905 g/cc, a melt index from 0.2 g/10 min to 50 g/10 min [include in spec], and a Tm less than 125° C.

The present disclosure provides a process. In an embodiment, the process includes (A) providing a fitment having a top portion, a base, and a channel extending through the top portion and the base. The fitment is composed of a polymeric composition. The polymeric composition includes (i) from 70 to 90 weight percent of a high density polyethylene (HDPE) having a density from 0.940 g/cc to 0.970 g/cc, a melt temperature, Tm, greater than 125° C., and a melt index from 1 g/10 min to 50 g/10 min; and (ii) from 30 to 10 weight percent of an olefin-based elastomer having a density from 0.860 g/cc to 0.905 g/cc and a Tm less than 125° C. The process includes (B) placing the base between two opposing multilayer films, each multilayer film having a respective seal layer comprising an olefin-based polymer. The process includes (C) sealing the base to each multilayer film under heat seal conditions. The process includes (D) forming a seal between the fitment and the multilayer films.

The present disclosure provides a container. In an embodiment, a flexible container is provided and includes a first multilayer film and a second multilayer film. Each multilayer film includes a seal layer. The multilayer films are arranged such that the seal layers oppose each other and the second multilayer film is superimposed on the first multilayer film. The flexible container includes a fitment sandwiched between the first multilayer film and the second multilayer film. The fitment has a base. The fitment is composed of a polymeric composition. The polymeric composition includes (i) from 70 weight percent to 90 weight percent of a high density polyethylene (HDPE) having a density from 0.940 g/cc to 0.970 g/cc, a melt temperature, Tm, greater than 125° C., and a melt index from 1 g/10 min to 50 g/10 min; and (ii) from 10 weight percent to 30 weight percent of an olefin-based elastomer having a density from 0.860 g/cc to 0.905 g/cc and a Tm less than 125° C. The base is sealed to the first multilayer film and the second multilayer film.

BRIEF DESCRIPTION OF THE DRAWINGS

FIG. 7 is a graph showing seal reduction time by fitment resin composition.

DEFINITIONS

Figure 1:
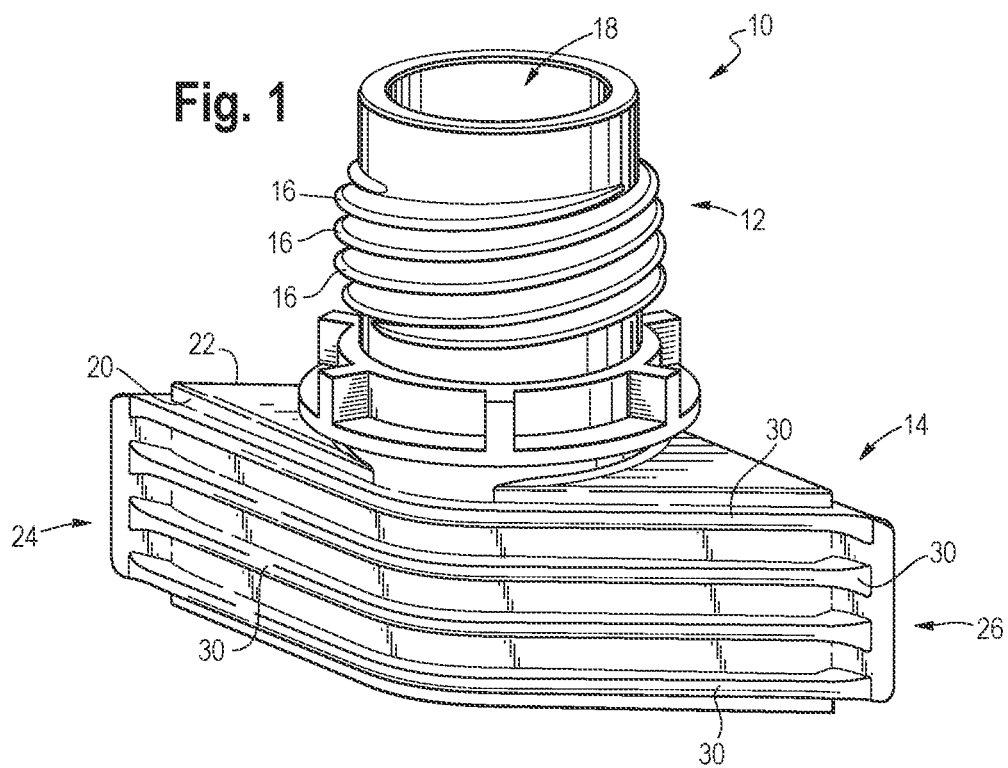
FIG. 1 is a perspective view of a fitment in accordance with an embodiment of the present disclosure.

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all components and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

The numerical ranges disclosed herein include all values from, and including, the lower value and the upper value. For ranges containing explicit values (e.g., 1, or 2, or 3 to 5, or 6, or 7) any subrange between any two explicit values is included (e.g., 1 to 2; 2 to 6; 5 to 7; 3 to 7; 5 to 6; etc.).

Unless stated to the contrary, implicit from the context, or customary in the art, all components and percents are based on weight, and all test methods are current as of the filing date of this disclosure.

Burst Test—the burst test requires the assembly of the fitment to the pouch and the manual capping the fitment. No specific torque value or wrench is used for the capping process. Once the pouch is assembled, the bottom end is cut out leaving an opening where this would later be clamped to be inflated/pressurized. Burst testing is conducted by pressurizing the assembled pouch and fitment through the bottom end until the seal bursts or otherwise ruptures. An average of 20 pouches is reported. Results are reported in kiloPascals, kPa.

The term "composition," as used herein, refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Density is measured in accordance with ASTM D 792.

Elastic recovery is measured as follows. Stress-strain behavior in uniaxial tension is measured using an Instron™ universal testing machine at 300% min$^{-1}$ deformation rate at 21° C. The 300% elastic recovery is determined from a loading followed by unloading cycle to 300% strain, using ASTM D 1708 microtensile specimens. Percent recovery for all experiments is calculated after the unloading cycle using the strain at which the load returned to the base line.

The percent recovery is defined as:

% Recovery=100*($Ef$–$Es$)/$Ef$ where $Ef$ is the strain taken for cyclic loading and $Es$ is the strain where the load returns to the baseline after the unloading cycle.

An "ethylene-based polymer," as used herein, is a polymer that contains more than 50 weight percent polymerized ethylene monomer (based on the total amount of polymerizable monomers) and, optionally, may contain at least one comonomer.

Gel Permeation Chromotography (GPC) is performed using a high temperature triple detector GPC system consisting of a Waters (Milford, Mass.) 150° C. high temperature chromatograph, equipped with an infra-red detector (IR4 from PolymerChar, Valencia, Spain). Concentration is measured with the infra-red detector. The carrier solvent used is 1,2,4-trichlorobenzene (TCB). The system was equipped with an on-line solvent degas device from Polymer Laboratories. The carousel compartment was operated at 150° C. Four Mixed-A 30 cm, 20 micron columns are used from Polymer Laboratories. The chromatographic solvent (TCB) and the sample preparation solvent contain 200 ppm of butylated hydroxytoluene (BHT) and both solvent sources are nitrogen sparged. The polymer samples are stirred gently at 160° C. for 4 hours prior to injection. The injection volume is 200 ul, and the flow rate is 1.0 ml/minute.

"Linear low density polyethylene" (or "LLDPE") is a linear ethylene-α-olefin copolymer containing heterogeneous short-chain branching distribution comprising units derived from ethylene and units derived from at least one $C_3$-$C_{10}$ α-olefin comonomer or at least one $C_4$-$C_8$ α-olefin comonomer, or at least one $C_6$-$C_8$ α-olefin comonomer. LLDPE is characterized by little, if any, long chain branching, in contrast to conventional LDPE. LLDPE has a density from 0.910 g/cc, or 0.915 g/cc, or 0.920 g/cc, or 0.925 g/cc to 0.930 g/cc, or 0.935 g/cc, or 0.940 g/cc. Nonlimiting examples of LLDPE include TUFLIN™ linear low density polyethylene resins (available from The Dow Chemical Company), DOWLEX™ polyethylene resins (available from the Dow Chemical Company), and MARLEX™ polyethylene (available from Chevron Phillips).

Mechanical Properties (Flexural Modulus, Tensiles) are measured in accordance to ASTM standards. ASTM D 4976, Standard Specification for Polyethylene Plastics Molding and Extrusion Materials, sections 12.1.3 and 12.1.4 is followed. For flexural testing ASTM D 7901, Standard Test Methods for Flexural Properties of Unreinforced and Reinforced Plastics and Electrical Insulating Materials, is followed. For tensile testing ASTM D 638, Standard Test Method for Tensile Properties of Plastics, is followed. Results are reported in Megapascals (MPa) and Newtonmeters (Nm).

Melt flow rate (MFR) is measured in accordance with ASTM D 1238, Condition 230° C./2.16 kg (g/10 minutes).

Melt index (MI) is measured in accordance with ASTM D 1238, Condition 190° C./2.16 kg (g/10 minutes).

Melt temperature, or "Tm" as used herein (also referred to as a melting peak in reference to the shape of the plotted DSC curve), is typically measured by the DSC (Differential Scanning calorimetry) technique for measuring the melting points or peaks of polyolefins as described in U.S. Pat. No. 5,783,638, wherein the Tm is the second heat melt temperature taken at a ramp rate of 10° C./min and Tm is largest peak. The heat of fusion (Hf) (measured in Joules/gram, J/g) and the peak melting temperature are reported from the second heat curve. Peak crystallization temperature is determined from the cooling curve. Crystallization temperature, Tc, is determined from the DSC cooling curve as above except the tangent line is drawn on the high temperature side of the crystallization peak. Where this tangent intersects the baseline is the extrapolated onset of crystallization (Tc). It should be noted that many blends comprising two or more polyolefins will have more than one melting point or peak, many individual polyolefins will comprise only one melting point or peak.

An "olefin-based polymer," as used herein is a polymer that contains more than 50 weight percent polymerized olefin monomer (based on total amount of polymerizable monomers), and optionally, may contain at least one comonomer. Nonlimiting examples of olefin-based polymer include ethylene-based polymer and propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 weight percent polymerized propylene monomer (based on the total amount of polymerizable monomers) and, optionally, may contain at least one comonomer.

DETAILED DESCRIPTION

The present disclosure provides a fitment. The fitment includes a top portion, a base, and a channel. The channel extends through the top portion and the base for passage of a flowable material. The base has a shape when the fitment is viewed from bottom plan view. Nonlimiting examples of suitable shapes for the base (when fitment is viewed from bottom plan view) include circle, ellipse, canoe, polygon, and regular polygon (triangle, square, pentagon, hexagon, heptagon, octagon, etc.).

The fitment is composed of a polymeric composition. The polymeric composition includes (i) from 70 to 90 weight percent of a high density polyethylene (HDPE) and (ii) from 30 weight percent to 10 weight percent of an olefin-based elastomer. The HDPE has a density from 0.940 g/cc to 0.970 g/cc, a melt temperature, Tm, greater than 125° C., and a melt index from 1 g/10 min to 50 g/10 min. The olefin-based elastomer has a density from 0.860 g/cc to 0.905 g/cc, a melt index from 0.2 g/10 min to 50 g/10 min, and a Tm less than 125° C.

1. HIGH DENSITY POLYETHYLENE

The polymeric composition of the fitment includes a high density polyethylene. A "high density polyethylene" (or "HDPE") is an ethylene-based polymer having a density of at least 0.94 g/cc, or from at least 0.94 g/cc to 0.97 g/cc. The HDPE has a melt index from 1.0 g/10 min to 50 g/10 min. The HDPE has a melt temperature, Tm, greater than 125° C.

The HDPE can be an ethylene homopolymer or the HDPE can include ethylene and one or more $C_3$-$C_{20}$ α-olefin comonomers. The comonomer(s) can be linear or branched. Nonlimiting examples of suitable comonomers include propylene, 1-butene, 1 pentene, 4-methyl-1-pentene, 1-hexene, and 1-octene. The HDPE can be prepared with either Ziegler-Natta, chromium-based, constrained geometry or metallocene catalysts in slurry reactors, gas phase reactors or solution reactors. The ethylene/$C_3$-$C_{20}$ α-olefin comonomer includes at least 50 percent by weight ethylene polymerized therein, or at least 70 percent by weight, or at least 80 percent by weight, or at least 85 percent by weight, or at least 90 weight percent, or at least 95 percent by weight ethylene in polymerized form.

In an embodiment, the HDPE is an ethylene/α-olefin copolymer having one, some, or all of the following properties:

(i) a density from 0.940 g/cc, or 0.950 g/cc, or 0.952 g/cc, or 0.955 g/cc, or 0.960 g/cc to 0.965 g/cc, or 0.970 g/cc; and/or (ii) a melt index from 1.0 g/10 min, or 1.5 g/10 min, or 2.0 g/10 min, or 2.5 g/10 min, or 2.5, or 3.0 g/10 min, or 4.0 g/10 min, or 5.0 g/10 min to 6.0 g/10 min, or 7.0 g/10 min, or 8.0 g/10 min, or 9.0 g/10 min, or 10 g/10 min, or 20 g/10 min, or 30 g/10 min or 50 g/10 min.

In an embodiment, the HDPE has a density from 0.945 g/cc to 0.970 g/cc, a melt index from 1.0 g/10 min to 30 g/10 min; and a Tm from 127° C., or 129.0° C., or 129.5° C. to 130.0° C., or 130.5° C., or 131.0° C.

In an embodiment, the HDPE has a density from 0.945 g/cc to 0.955 g/cc and a melt index from 1.5 g/10 min to 20.0 g/min and a Tm from 129.5° C. to 130.5° C.

Nonlimiting examples of suitable HDPE include DMDA-8910, DMDA-1206, DMDA-1230, DMDA-1250, DMDA-8920, DMDA-8007, DMDC-1210, HDPE 17450N, ELITE 5960G, HDPE KT 10000 UE, HDPE KS 10100 UE and HDPE 35057E, each available from The Dow Chemical Company Midland, Mich., USA; and SURPASS® available from Nova Chemicals Corporation, Calgary, Alberta, Canada.

2. OLEFIN-BASED ELASTOMER

The polymeric composition of the fitment includes an olefin-based elastomer. An "elastomer" is a rubber-like polymer that can be stretched to at least twice its original length and which retracts very rapidly to approximately its original length when the force exerting the stretching is released. An elastomer has an elastic modulus of about 10,000 psi (68.95 MPa) or less and an elongation usually greater than 200% in the uncrosslinked state at room temperature using the method of ASTM D638-72. The foregoing properties are hereafter referred to as "elastomeric properties." The olefin-based elastomer is an olefin-based polymer having the foregoing elastomeric properties. The olefin-based elastomer can be (i) an ethylene-based elastomer, (ii) a propylene-based elastomer, or (iii) a combination of (i) and (ii). The olefin-based elastomer has a density from 0.860 g/cc to 0.905 g/cc, a melt index 0.2 g/10 min to 50 g/10 min, and a Tm less than 125° C.

a. Ethylene-Based Elastomer

In an embodiment, the olefin-based elastomer is an ethylene-based elastomer.

An "ethylene-based elastomer," is an ethylene-based polymer comprising at least 50 wt % units derived from ethylene and having the foregoing elastomeric properties.

In an embodiment, the ethylene-based elastomer is an ethylene/$C_4$-$C_8$ α-olefin copolymer having the foregoing elastomeric properties. In a further embodiment, the α-olefin comonomer is a $C_4$-$C_8$ α-olefin selected from 1-butene, 1-hexene, or 1-octene.

In an embodiment, the ethylene-based elastomer is an ethylene/$C_4$-$C_8$ α-olefin copolymer having one, some, or all of the following properties:

(i) a density from 0.860 g/cc, or 0.866 g/cc, or 0.870/cc, to 0.880 g/cc, or 0.885 g/cc, or 0.890 g/cc or 0.902 g/cc or 0.905 g/cc; and/or (ii) a melting temperature, Tm, from 34° C., or 40° C., or 45° C., or 50° C., or 55° C., or 60° C., to 75° C., or 80° C. or 93° C., or 98° C. or 100° C.; and/or (iii) a melt index from 0.5 g/10 min, or 1.0 g/10 min, or 1.5 g/10 min, or 2.0 g/10 min, or 2.5 g/10 min to 3.0 g/10 min, or 3.5 g/10 min, or 4.0 g/10 min, or 4.5 g/10 min, or 5.0 g/10 min, or 10 g/10 min, or 15 g/10 min, or 20 g/10 min, or 30 g/10 min.

Nonlimiting examples of suitable ethylene-based elastomers include polymers sold under the tradenames ENGAGE™ and AFFINITY™ available from The Dow Chemical Company.

In an embodiment, the ethylene-based elastomer is an ethylene/α-olefin multi-block copolymer. The term "ethylene/α-olefin multi-block copolymer" is a copolymer that includes ethylene and one or more copolymerizable α-olefin comonomers in polymerized form, characterized by multiple blocks or segments of two or more polymerized monomer units differing in chemical or physical properties. The term "ethylene/α-olefin multi-block copolymer" includes block copolymer with two blocks (di-block) and more than two blocks (multi-block). The terms "interpolymer" and "copolymer" are used interchangeably herein. When referring to amounts of "ethylene" or "comonomer" in the copolymer, it is understood that this means polymerized units thereof. In some embodiments, the ethylene/α-olefin multi-block copolymer can be represented by the following formula:

$(AB)_n$ 

where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked, or covalently bonded, in a substantially linear fashion, or in a linear manner, as opposed to a substantially branched or substantially star-shaped fashion. In other embodiments, A blocks and B blocks are randomly distributed along the polymer chain. In other words, the block copolymers usually do not have a structure as follows:

AAA-AA-BBB-BB 

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole block copolymer, i.e., ethylene comprises at least 50 mole percent of the whole polymer. More preferably ethylene comprises at least 60 mole percent, at least 70 mole percent, or at least 80 mole percent, with the substantial remainder of the whole polymer comprising at least one other comonomer that is preferably an α-olefin having 3 or more carbon atoms, or 4 or more carbon atoms. In some embodiments, the ethylene/α-olefin multi-block copolymer may comprise 50 mol % to 90 mol % ethylene, or 60 mol % to 85 mol % ethylene, or 65 mol % to 80 mol % ethylene. For many ethylene/octene multi-block copolymers, the composition comprises an ethylene content greater than 80 mole percent of the whole polymer and an octene content of from 10 to 15, or from 15 to 20 mole percent of the whole polymer.

The ethylene/α-olefin multi-block copolymer includes various amounts of "hard" segments and "soft" segments. "Hard" segments are blocks of polymerized units in which ethylene is present in an amount greater than 90 weight percent, or 95 weight percent, or greater than 95 weight percent, or greater than 98 weight percent based on the weight of the polymer, up to 100 weight percent. In other words, the comonomer content (content of monomers other than ethylene) in the hard segments is less than 10 weight percent, or 5 weight percent, or less than 5 weight percent, or less than 2 weight percent based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 weight percent, or greater than 8 weight percent, greater than 10 weight percent, or greater than 15 weight percent based on the weight of the polymer. In some embodiments, the comonomer content in the soft segments can be greater than 20 weight percent, greater than 25 weight percent, greater than 30 weight percent, greater than 35 weight percent, greater than 40 weight percent, greater than 45 weight percent, greater than 50 weight percent, or greater than 60 weight percent and can be up to 100 weight percent.

The soft segments can be present in an ethylene/α-olefin multi-block copolymer from 1 weight percent to 99 weight percent of the total weight of the ethylene/α-olefin multi-block copolymer, or from 5 weight percent to 95 weight percent, from 10 weight percent to 90 weight percent, from 15 weight percent to 85 weight percent, from 20 weight percent to 80 weight percent, from 25 weight percent to 75 weight percent, from 30 weight percent to 70 weight percent, from 35 weight percent to 65 weight percent, from 40 weight percent to 60 weight percent, or from 45 weight percent to 55 weight percent of the total weight of the ethylene/α-olefin multi-block copolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, entitled "Ethylene/α-Olefin Block Interpolymers," filed on Mar. 15, 2006, in the name of Colin L. P. Shan, Lonnie Hazlitt, et al. and assigned to Dow Global Technologies Inc., the disclosure of which is incorporated by reference herein in its entirety. In particular, hard segment and soft segment weight percentages and comonomer content may be determined as described in Column 57 to Column 63 of U.S. Pat. No. 7,608,668.

The ethylene/α-olefin multi-block copolymer is a polymer comprising two or more chemically distinct regions or segments (referred to as "blocks") preferably joined (or covalently bonded) in a linear manner, that is, a polymer comprising chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present ethylene/α-olefin multi-block copolymer is characterized by unique distributions of both polymer polydispersity (PDI or Mw/Mn or MWD), polydisperse block length distribution, and/or polydisperse block number distribution, due, in an embodiment, to the effect of the shuttling agent(s) in combination with multiple catalysts used in their preparation.

In an embodiment, the ethylene/α-olefin multi-block copolymer is produced in a continuous process and possesses a polydispersity index (Mw/Mn) from 1.7 to 3.5, or from 1.8 to 3, or from 1.8 to 2.5, or from 1.8 to 2.2. When produced in a batch or semi-batch process, the ethylene/α-olefin multi-block copolymer possesses Mw/Mn from 1.0 to 3.5, or from 1.3 to 3, or from 1.4 to 2.5, or from 1.4 to 2.

In addition, the ethylene/α-olefin multi-block copolymer possesses a PDI (or Mw/Mn) fitting a Schultz-Flory distribution rather than a Poisson distribution. The present ethylene/α-olefin multi-block copolymer has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the present ethylene/α-olefin multi-block copolymer possesses a most probable distribution of block lengths.

In a further embodiment, the ethylene/α-olefin multi-block copolymer of the present disclosure, especially those made in a continuous, solution polymerization reactor, possess a most probable distribution of block lengths. In one embodiment of this disclosure, the ethylene multi-block interpolymers are defined as having:

(A) Mw/Mn from about 1.7 to about 3.5, at least one melting point, Tm, in degrees Celsius, and a density, d, in grams/cubic centimeter, where in the numerical values of Tm and d correspond to the relationship:

$$Tm > -2002.9 + 4538.5(d) - 2422.2(d)^2, \text{ and/or}$$

(B) Mw/Mn from about 1.7 to about 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYSTAF") peak, wherein the numerical values of ΔT and ΔH have the following relationships:

$$\Delta T > -0.1299(\Delta H) + 62.81 \text{ for } \Delta H \text{ greater than zero and up to 130 J/g}$$

$$\Delta T \geq 48° \text{ C. for } \Delta H \text{ greater than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30° C.; and/or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re > 1481 - 1629(d); \text{ and/or}$$

(D) has a molecular weight fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer; and/or (E) has a storage modulus at 25° C., G'(25° C.), and a storage modulus at 100° C., G'(100° C.), wherein the ratio of G'(25° C.) to G'(100° C.) is in the range of about 1:1 to about 9:1.

The ethylene/α-olefin multi-block copolymer may also have:

(F) molecular fraction which elutes between 40° C. and 130° C. when fractionated using TREF, characterized in that the fraction has a block index of at least 0.5 and up to about 1 and a molecular weight distribution, Mw/Mn, greater than about 1.3; and/or (G) average block index greater than zero and up to about 1.0 and a molecular weight distribution, Mw/Mn greater than about 1.3.

Suitable monomers for use in preparing the present ethylene/α-olefin multi-block copolymer include ethylene and one or more addition polymerizable monomers other than ethylene. Examples of suitable comonomers include straight-chain or branched α-olefins of 3 to 30, or 3 to 20, or 4 to 12 carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, or 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8α-octahydronaphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

In an embodiment, the comonomer is selected from butene, hexene, and octene.

The ethylene/α-olefin multi-block copolymer can be produced via a chain shuttling process such as described in U.S. Pat. No. 7,858,706, which is herein incorporated by reference. In particular, suitable chain shuttling agents and related information are listed in Col. 16, line 39 through Col. 19, line 44. Suitable catalysts are described in Col. 19, line 45 through Col. 46, line 19 and suitable co-catalysts in Col. 46, line 20 through Col. 51 line 28. The process is described throughout the document, but particularly in Col. Col 51, line 29 through Col. 54, line 56. The process is also described, for example, in the following: U.S. Pat. Nos. 7,608,668; 7,893,166; and 7,947,793.

In an embodiment, the ethylene/α-olefin multi-block copolymer has hard segments and soft segments and is defined as having:

a Mw/Mn from 1.7 to 3.5, at least one melting point, Tm, in degrees Celsius, and a density, d, in grams/cubic centimeter, where in the numerical values of Tm and d correspond to the relationship:

$$Tm < -2002.9 + 4538.5(d) - 2422.2(d)^2,$$

where d is from 0.86 g/cc, or 0.87 g/cc, or 0.88 g/cc to 0.89 g/cc; and

Tm is from 80° C., or 85° C., or 90° C. to 95, or 99° C., or 100° C., or 105° C. to 110° C., or 115° C., or 120° C., or 125° C.

In an embodiment, the ethylene/α-olefin multi-block copolymer is an ethylene/octene multi-block copolymer and has one, some, any combination of, or all the properties (i)-(ix) below:

(i) a melt temperature (Tm) from 80° C., or 85° C., or 90° C. to 95, or 99° C., or 100° C., or 105° C. to 110° C., or 115° C., or 120° C., or less than 125° C.; and/or (ii) a density from 0.86 g/cc, or 0.866 g/cc or 0.87 g/cc, or 0.88 g/cc to 0.89 g/cc;

(iii) 50-85 wt % soft segment and 40-15 wt % hard segment; and/or (iv) from 10 mol %, or 13 mol %, or 14 mol %, or 15 mol % to 16 mol %, or 17 mol %, or 18 mol %, or 19 mol %, or 20 mol % octene in the soft segment; and/or (v) from 0.5 mol %, or 1.0 mol %, or 2.0 mol %, or 3.0 mol % to 4.0 mol %, or 5 mol %, or 6 mol %, or 7 mol %, or 9 mol % octene in the hard segment; and/or (vi) a melt index (MI) from 1 g/10 min, or 2 g/10 min, or 5 g/10 min, or 7 g/10 min to 10 g/10 min, or 15 g/10 min, or 20 g/10 min, or 25 g/10 min, or 30 g/10 min; and/or (vii) a Shore A hardness from 65, or 70, or 71, or 72 to 73, or 74, or 75, or 77, or 79, of 80; and/or (viii) an elastic recovery (Re) from 50%, or 60% to 70%, or 80%, or 90%, at 300% min$^{-1}$ deformation rate at 21° C. as measured in accordance with ASTM D 1708; and/or (ix) a polydisperse distribution of blocks and a polydisperse distribution of block sizes.

In an embodiment, the ethylene/α-olefin multi-block copolymer is an ethylene/octene multi-block copolymer.

The present ethylene/α-olefin multi-block copolymer may comprise two or more embodiments disclosed herein.

In an embodiment, the ethylene/octene multi-block copolymer is sold under the Tradename INFUSE™ and available from The Dow Chemical Company, Midland, Mich., USA. In a further embodiment, the ethylene/octene multi-block copolymer is INFUSE™ 9807.

In an embodiment, the ethylene/octene multi-block copolymer is INFUSE™ 9817.

In an embodiment, the ethylene/octene multi-block copolymer is INFUSE™ 9500.

In an embodiment, the ethylene/octene multi-block copolymer is INFUSE™ 9507.

b. Propylene-Based Elastomer

In an embodiment, the olefin-based elastomer is a propylene-based elastomer. A "propylene-based elastomer," is a propylene-based polymer comprising at least 50 wt % units derived from propylene and having the foregoing elastomeric properties.

In an embodiment, the propylene-based elastomer is a propylene/ethylene copolymer having from 3 wt %, or 4 wt %, or 5 wt %, or 6 wt %, or 7 wt % to 8 wt %, or 9 wt %, or 10 wt %, or 11 wt %, or 12 wt %, or 13 wt %, or 14 wt %, or 15 wt % ethylene comonomer (based on total weight of the elastomer). The propylene-based elastomer has a heat of fusion less than 100 J/g and an Mw/Mn less than 3.5. The propylene-based elastomer has a heat of fusion less than 40 J/g when the ethylene comonomer content is from 10 wt %, or 11 wt %, or 12 wt % to 13 wt %, or 14 wt %, or 15 wt %.

In an embodiment, the propylene-based elastomer is a propylene/ethylene copolymer with from 3 wt % to less than 10 wt % ethylene comonomer and having one, some, or all of the following properties:

(i) a density from 0.858 g/cc, or 0.860 g/cc to 0.870/cc, or 0.880 g/cc, 0.885 g/cc, or 0.890; and/or (ii) a melt temperature, Tm, from 55° C., or 60° C., or 65° C., or 70° C., or 75° C. to 80° C., or 85° C., or 90° C. to 95° C., or 100° C., or 105° C., or 107° C., or 110° C.; and/or (iii) a melt flow rate from 1.0 g/10 min, or 1.5 g/10 min, or 2.0 g/10 min, or 2.5 g/10 min to 3.0 g/10 min, or 3.5 g/10 min, or 4.0 g/10 min, or 4.5 g/10 min, or 5.0 g/10 min, or 8 g/10 min, or 15 g/10 min, or 25 g/10 min.

Nonlimiting examples of suitable propylene-based elastomer include VERSIFY 2000 and VERSIFY 2200, available from The Dow Chemical Company.

3. POLYMERIC COMPOSITION

The polymeric composition of the fitment includes from 70, or 75, or 80 to 85, or 90 weight percent of the HDPE and from 30, or 25, or 20 to 15, or 10 weight percent of the olefin-based elastomer. Weight percent is based on total weight of the polymeric composition. It is understood that the amount of HDPE and the reciprocal amount of olefin-based elastomer yield 100 weight percent. The HDPE and the olefin-based elastomer can be any respective HDPE and olefin-based elastomer disclosed herein. The HDPE has a density from 0.940 g/cc to 0.970 g/cc, a melt temperature, Tm, greater than 125° C., and a melt index from 1 g/10 min to 50 g/10 min. The olefin-based elastomer has a density from 0.860 g/cc to 0.905, and a Tm less than 125° C.

The polymeric composition has one, some, or all of the following properties:

(i) a density from 0.930 g/cc, or 0.935 g/cc, or 0.939 g/cc, or 0.940 g/cc to 0.942 g/cc, or 0.945 g/cc; and/or (ii) a melt index from 1.0 g/10 min, or 1.5 g/10 min, or 2.0 g/10 min, or 4 g/10 min, 6 g/10 min, 8.0 g/10 min, or 8.5 g/10 min, or 9.0 g/10 min, or 9.5 g/10 min to 10.0 g/10 min, or 10.5 g/10 min, or 11.0 g/10 min, or 11.5 g/10 min, or 13 g/10 min, or 18 g/10 min, or 23 g/10 min, or 26 g/10 min, or 30 g/10 min; and/or (iii) a Tm from 127° C., or 129° C. to 130° C., or 131° C.

In an embodiment, the polymeric composition has a density from 0.930 g/cc to 0.945 g/cc, and melt index from 1.0 g/10 min, or 1.5 g/10 min to 18 g/10 min, or 30 g/10 min.

In an embodiment, the polymeric composition has a density from 0.930 g/cc to 0.945 g/cc, and melt index from 8.0 g/10 min to 11.0 g/10 min and a Tm from 129° C. to 131° C.

In an embodiment, the polymeric composition includes from 75 wt % to 85 wt % HDPE and from 25 wt % to 15 wt % of an olefin-based elastomer. The HDPE has a density from 0.945 g/cc to 0.965 g/cc and a melt index from 1.5 g/10 min to 25 g/10 min. The olefin-based elastomer has a density from 0.864 g/cc to 0.905 g/cc.

In an embodiment, the polymeric composition includes from 75 wt % to 85 wt % HDPE and from 25 wt % to 15 wt % of an ethylene-based elastomer. The HDPE has a density from 0.945 g/cc to 0.965 g/cc and a melt index from 1.5 g/10 min to 25 g/10 min. The ethylene-based elastomer has a density from 0.864 g/cc to 0.905 g/cc.

In an embodiment, the polymeric composition includes an HDPE with Tm greater than 125° C., Tm1, and an olefin-based elastomer with Tm less than 125° C., Tm2. The HDPE Tm1 and the olefin-based elastomer Tm2 fulfill the following Formula (1):

$$Tm1-Tm2>10° C.$$

In an embodiment, the polymeric composition includes from 80 wt % of an HDPE having a density from 0.945 g/cc to 0.955 g/cc and a melt index from 9.0 g/10 min to 10.0 g/min and a Tm from 129.5° C. to 130.5° C. The polymeric composition also includes 20 wt % of an ethylene-based elastomer having a density from 0.865 g/cc to 0.875 g/cc and a melt index from 9.0 g/10 min to 10.0 g/min and a Tm from 60° C. to 70° C. The polymeric composition has a density from 0.935 g/cc to 0.945 g/cc, a melt index from 10.5 g/10 min to 11.5 g/10 min, and a Tm from 129° C. to 131° C.

In an embodiment, the polymeric composition includes from 80 wt % of an HDPE having a density from 0.945 g/cc to 0.955 g/cc and a melt index from 9.0 g/10 min to 10.0 g/min and a Tm from 129.5° C. to 130.5° C. The polymeric composition also includes 20 wt % of an ethylene-based elastomer having a density from 0.900 g/cc to 0.905 g/cc and a melt index from 7.0 g/10 min to 8.0 g/min and a Tm from 97° C. to 99° C. The polymeric composition has a density from 0.935 g/cc to 0.945 g/cc, a melt index from 8 g/10 min to 9 g/10 min, and a Tm from 129° C. to 131° C.

In an embodiment, the polymeric composition includes from 80 wt % of an HDPE having a density from 0.945 g/cc to 0.955 g/cc and a melt index from 9.0 g/10 min to 10.0 g/min and a Tm from 129.5° C. to 130.5° C. The polymeric composition also includes 20 wt % of an ethylene/α-olefin multi-block copolymer having a density from 0.865 g/cc to 0.875 g/cc and a melt index from 14.0 g/10 min to 16.0 g/min and a Tm from 117° C. to 119° C. The polymeric composition has a density from 0.935 g/cc to 0.945 g/cc, a melt index from 10.0 g/10 min to 11.0 g/10 min, and a Tm from 129° C. to 131° C.

4. FITMENT STRUCTURE

Figure 2:
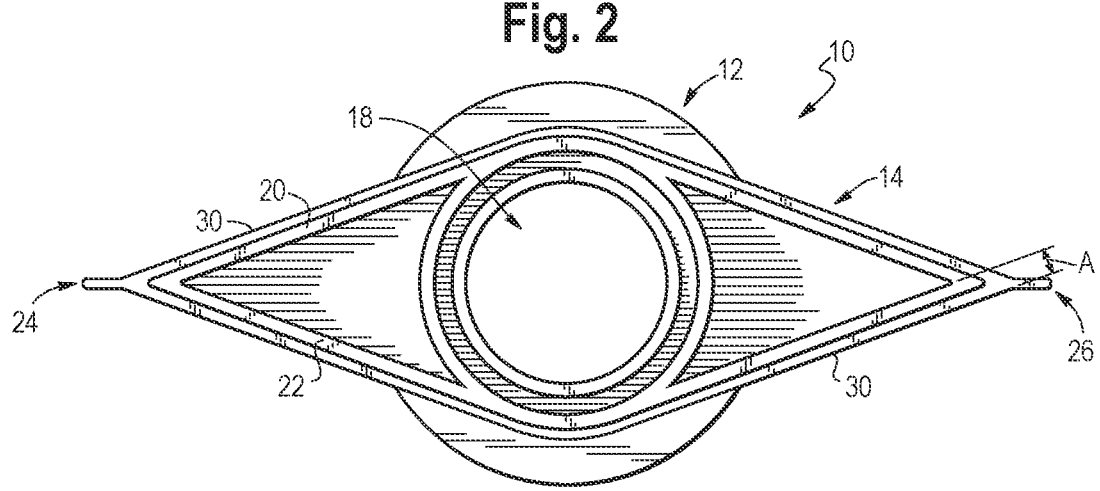
FIG. 2 is bottom plan view of the fitment of FIG. 1.

In an embodiment, a fitment 10 is provided as shown in FIGS. 1-2. The fitment 10 has a top portion 12 and a base 14. The fitment 10 is composed of the polymeric composition. The polymeric composition may be any of the polymeric compositions disclosed above. The base 14 is structured to be placed between opposing flexible films and sealed to form a flexible container as will be discussed in detail below. The top portion 12 may include threads 16, or other structure, for securing a closure to the top portion.

The base 14 includes a pair of opposing sidewalls. Nonlimiting examples of suitable shapes formed by the sidewalls (when the fitment is viewed from bottom plan view) include circle, ellipse, polygon, and regular polygon (triangle, square, pentagon, hexagon, heptagon, octagon, etc.).

A channel 18 extends through the top portion 12 and the base 14. The channel 18 allows a flowable material to pass, or otherwise flow, through the fitment 10.

In an embodiment, the base 14 includes opposing sidewalls 20, 22 that define a canoe-shape (when the fitment is viewed from bottom plan view) as shown in FIG. 2. The sidewalls 20, 22 include the polymeric composition. Sidewalls 20, 22 extend around opposite sides of the channel 18 and join together to form opposing ends 24, 26. When the base 14 of the fitment 10 is sealed between two opposing flexible films, the shape of sidewalls 20, 22 and the shape of the ends 24, 26 allow for a gradual transition from opposing flexible films to a diametrical center 28 of the base 14.

In an embodiment, at least one sealing rib 30 (hereafter "sealing rib(s)") extends along sidewalls 20, 22. The sealing rib(s) 30 includes the polymeric composition.

5. PROCESS

The present disclosure provides a process. In an embodiment, the process includes (A) providing a fitment having a top portion, a base, and a channel extending through the top portion and the base. The fitment is composed of a polymeric composition comprising (i) from 70 to 90 weight percent of a high density polyethylene (HDPE) having a density from 0.940 g/cc to 0.970 g/cc, a melt temperature, Tm, greater than 125° C., and a melt index from 1 g/10 min to 50 g/10 min; and (ii) from 30 to 10 weight percent of an olefin-based elastomer having a density from 0.860 g/cc to 0.905 g/cc and a Tm less than 125° C. The process includes (B) placing the base between two opposing multilayer films, each multilayer film having a respective seal layer comprising an olefin-based polymer. The process includes (C) sealing the base to each multilayer film under heat seal conditions. The process includes forming a seal between the fitment and the multilayer films.

Figure 3:
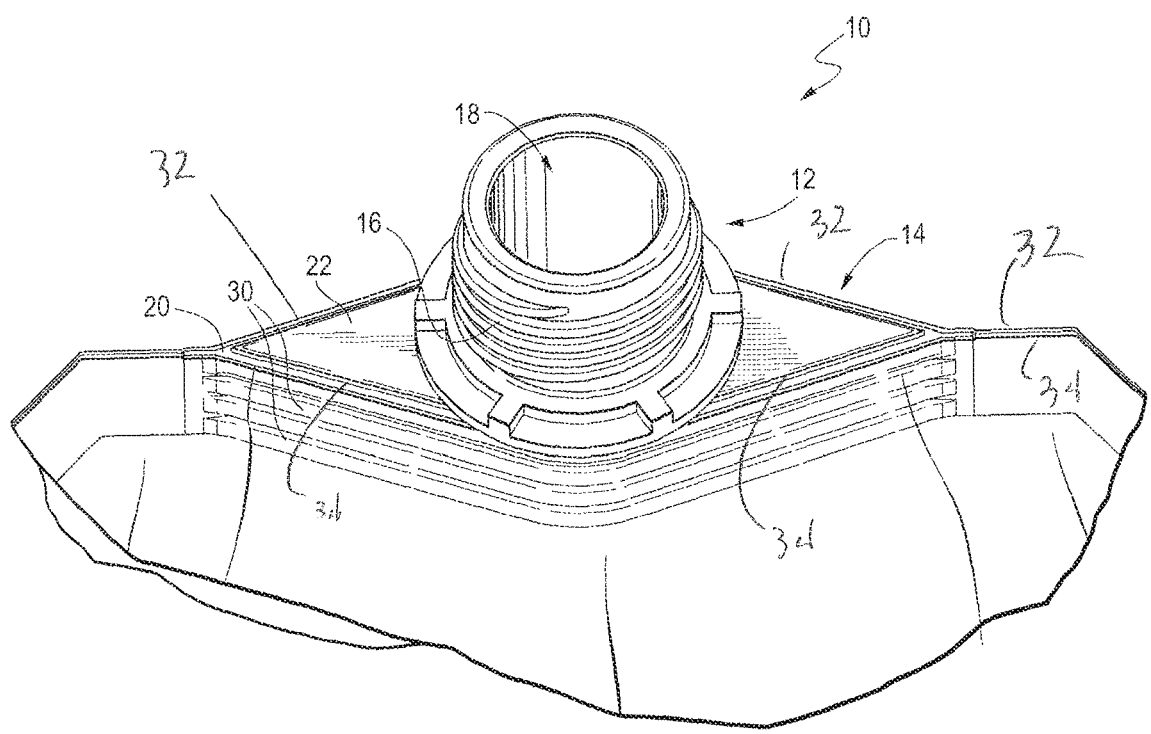
FIG. 3 is a perspective view of the fitment sealed to opposing multilayer films in accordance with an embodiment of the present disclosure.

The process includes placing the fitment base between two opposing multilayer films. The base 12 is placed, or otherwise is positioned, between two opposing multilayer films, multilayer film 32 and multilayer film 34 as shown in FIG. 3. Each multilayer film has a respective seal layer containing an olefin-based polymer.

In an embodiment, each multilayer film is flexible and has at least two, or at least three layers. The flexible multilayer film is resilient, flexible, deformable, and pliable. The structure and composition for each multilayer film may be the same or different. For example, each of two opposing multilayer films can be made from a separate web, each web having a unique structure and/or unique composition, finish, or print. Alternatively, each multilayer film can be the same structure and the same composition.

In an embodiment, each multilayer film 32, 34 is a flexible multilayer film having the same structure and the same composition.

Each flexible multilayer film 32, 34 may be (i) a coextruded multilayer structure or (ii) a laminate, or (iii) a combination of (i) and (ii). In an embodiment, each flexible multilayer film 32, 34 has at least three layers: a seal layer, an outer layer, and a tie layer between. The tie layer adjoins the seal layer to the outer layer. The flexible multilayer film may include one or more optional inner layers disposed between the seal layer and the outer layer.

In an embodiment, the flexible multilayer film is a coextruded film having at least two, or three, or four, or five, or six, or seven to eight, or nine, or 10, or 11, or more layers. Some methods, for example, used to construct films are by cast co-extrusion or blown co-extrusion methods, adhesive lamination, extrusion lamination, thermal lamination, and coatings such as vapor deposition. Combinations of these methods are also possible. Film layers can comprise, in addition to the polymeric materials, additives such as stabilizers, slip additives, antiblocking additives, process aids, clarifiers, nucleators, pigments or colorants, fillers and reinforcing agents, and the like as commonly used in the packaging industry. It is particularly useful to choose additives and polymeric materials that have suitable organoleptic and or optical properties.

The seal layer is a material capable of sealing the films to each other and capable of sealing to the fitment. Nonlimiting examples of suitable polymeric materials for the seal layer include olefin-based polymer (including any ethylene/$C_3$-$C_{10}$ α-olefin copolymers linear or branched), propylene-based polymer (including plastomer and elastomer, random propylene copolymer, propylene homopolymer, and propylene impact copolymer), ethylene-based polymer (including plastomer and elastomer, high density polyethylene ("HDPE"), low density polyethylene ("LDPE"), linear low density polyethylene ("LLDPE"), medium density polyethylene ("MDPE"), ethylene-acrylic acid or ethylene-methacrylic acid and their ionomers with zinc, sodium, lithium, potassium, magnesium salts, ethylene vinyl acetate copolymers and blends thereof.

Nonlimiting examples of suitable polymeric material for the outer layer include those used to make biaxially or monoaxially oriented films for lamination as well as coextruded films. Some nonlimiting polymeric material examples are polyethylene terephthalate (PET), biaxially oriented polyethylene terephthalate (OPET), monoaxially oriented nylon (MON), biaxially oriented nylon (BON), and biaxially oriented polypropylene (BOPP). Other polymeric materials useful in constructing film layers for structural benefit are polypropylenes (such as propylene homopolymer, random propylene copolymer, propylene impact copolymer, thermoplastic polypropylene (TPO) and the like, propylene-based plastomers (e.g., VERSIFY™ or VISTAMAX™)), polyamides (such as Nylon 6, Nylon 6,6, Nylon 6,66, Nylon 6,12, Nylon 12 etc.), polyethylene norbornene, cyclic olefin copolymers, polyacrylonitrile, polyesters, copolyesters (such as PETG), cellulose esters, polyethylene and copolymers of ethylene (e.g., LLDPE based on ethylene octene copolymer such as DOWLEX™, blends thereof, and multilayer combinations thereof.

Nonlimiting examples of suitable polymeric materials for the tie layer include functionalized ethylene-based polymers such as ethylene-vinyl acetate ("EVA"), polymers with maleic anhydride-grafted to polyolefins such as any polyethylene, ethylene-copolymers, or polypropylene, and ethylene acrylate copolymers such an ethylene methyl acrylate ("EMA"), glycidyl containing ethylene copolymers, propylene and ethylene based olefin block copolymers (OBC) such as INTUNE™ (PP-OBC) and INFUSE™ (PE-OBC) both available from The Dow Chemical Company, and blends thereof.

The flexible multilayer film may include additional layers which may contribute to the structural integrity or provide specific properties. The additional layers may be added by direct means or by using appropriate tie layers to the adjacent polymer layers. Polymers which may provide additional mechanical performance such as stiffness or opacity, as well polymers which may offer gas barrier properties or chemical resistance can be added to the structure.

Nonlimiting examples of suitable material for the optional barrier layer include copolymers of vinylidene chloride and methyl acrylate, methyl methacrylate or vinyl chloride (e.g., SARAN™ resins available from The Dow Chemical Company); vinylethylene vinyl alcohol (EVOH), metal foil (such as aluminum foil). Alternatively, modified polymeric films such as vapor deposited aluminum or silicon oxide on such films as BON, OPET, or OPP, can be used to obtain barrier properties when used in laminate multilayer film.

In an embodiment, the flexible multilayer film includes a seal layer selected from LLDPE (sold under the trade name DOWLEX™ (The Dow Chemical Company)), single-site LLDPE (substantially linear, or linear, olefin polymers, including polymers sold under the trade name AFFINITY™ or ELITE™ (The Dow Chemical Company) for example, ethylene vinyl acetate (EVA), ethylene ethyl acrylate (EEA), propylene-based plastomers or elastomers such as VERSIFY™ (The Dow Chemical Company), grafted olefin-based polymer (MAH-grafted), and blends thereof. An optional tie layer is selected from either ethylene-based olefin block copolymer PE-OBC (sold as INFUSE™) or propylene-based olefin block copolymer PP-OBC (sold as INTUNE™). The outer layer includes greater than 50 wt % of resin(s) having a melting point, Tm, that is from 25° C. to 30° C., or 40° C. or higher than the melting point of the polymer in the seal layer wherein the outer layer polymer is selected from resins such as AFFINITY™, LLDPE (DOWLEX™), VERSIFY™ or VISTAMAX, ELITE™, MDPE, HDPE or a propylene-based polymer such as propylene homopolymer, propylene impact copolymer or TPO.

In an embodiment, the flexible multilayer film is co-extruded.

In an embodiment, flexible multilayer film includes a seal layer selected from LLDPE (sold under the trade name DOWLEX™ (The Dow Chemical Company)), single-site LLDPE (substantially linear, or linear, olefin polymers, including polymers sold under the trade name AFFINITY™ or ELITE™ (The Dow Chemical Company) for example, propylene-based plastomers or elastomers such as VERSIFY™ (The Dow Chemical Company), grafted olefin-based polymer (MAH-grafted), and blends thereof. The flexible multilayer film also includes an outer layer that is a polyamide.

In an embodiment, the flexible multilayer film is a coextruded film or a laminated film, the seal layer is composed of an ethylene-based polymer, such as a linear or a substantially linear polymer, or a single-site catalyzed linear or substantially linear polymer of ethylene and an alpha-olefin monomer such as 1-butene, 1-hexene or 1-octene, having a Tm from 55° C. to 115° C. and a density from 0.865 to 0.925 g/cm$^3$, or from 0.875 to 0.910 g/cm$^3$, or from 0.888 to 0.900 g/cm$^3$. The outer layer is composed of a material selected from LLDPE, OPET, OPP (oriented polypropylene), BOPP, polyamide, and combinations thereof.

In an embodiment, the flexible multilayer film is a coextruded film or a laminated film having at least five layers, the coextruded film having a seal layer composed of an ethylene-based polymer, such as a linear or substantially linear polymer, or a single-site catalyzed linear or substantially linear polymer of ethylene and an alpha-olefin comonomer such as 1-butene, 1-hexene or 1-octene, the ethylene-based polymer having a Tm from 55° C. to 115° C. and a density from 0.865 to 0.925 g/cm$^3$, or from 0.875 to 0.910 g/cm$^3$, or from 0.888 to 0.900 g/cm$^3$ and an outermost layer composed of a material selected from LLDPE, OPET, OPP (oriented polypropylene), BOPP, polyamide, and combinations thereof.

In an embodiment, the flexible multilayer film is a two-layer film consisting of a seal layer and an outer layer (and optional adhesive layer therebetween). The seal layer is a LLDPE. The outer layer is coextruded to the seal layer and is composed of an HDPE. In this way, the entire flexible container (fitment and films) are composed solely of ethylene-based polymer.

The process includes sealing the base to each multilayer film under heat seal conditions. The term "heat seal conditions," as used herein, is the act of placing two or more films of polymeric material between opposing heat seal bars, the heat seal bars moved toward each other, sandwiching the films, to apply heat and pressure to the films such that opposing interior surfaces (seal layers) of the films contact, melt, and form a heat seal, or weld, to attach the films to each other. Heat sealing includes suitable structure and mechanism to move the seal bars toward and away from each other in order to perform the heat sealing procedure.

The base 12 is located, or otherwise is "sandwiched," between multilayer film 32 and the multilayer film 34 under heat seal conditions. The film-base-film sandwich is placed between heat seal bars which conform to the canoe-shaped base.

The compression force and heat imparted by the opposing seal bars (i) compress the seal layer of each multilayer film 32, 34 against the outer surface of the base 12; (ii) form a seal that welds base 12 to each of films 32 and 34 and welds films 32 and 34 to each other.

The polymeric composition of the fitment is a heterogeneous composition wherein the HDPE is the continuous phase with the discontinuous phase of the olefin-based elastomer dispersed therein. Bounded by no particular theory, it is believed the olefin-based elastomer discontinuous phase softens and melts first during the heat sealing. The melted discontinuous phase functions to wet and entangle the sealing interface during heat sealing to provide a wider melt window which increases production efficiencies and yields a stronger seal.

Applicant discovered processing efficiencies with the present fitment as compared to conventional fitments composed of HDPE. In an embodiment, a fitment base consisting of only HDPE (base 2) has the same structure as the base of the fitment of the present disclosure. The base 2 HDPE has a density from 0.940 g/cc to 0.970 g/cc, a Tm greater than 125° C., and a melt index from 1 g/10 min to 50 g/10 min. In this embodiment, the process includes sealing the present base under a first set of pressure and temperature heat seal conditions with a given type of multilayer films, hereafter referred to as condition 1. The process includes forming a hermetic seal at a dwell time 1 wherein dwell time 1 is less than the dwell time required to form a hermetic seal between fitment base 2 and the multilayer films under condition 1 (hereafter dwell time 2). In other words, under the same temperature and pressure heat seal conditions and with the same type of multilayer films, use of the present fitment with the two-component polymeric composition requires less seal bar dwell time to obtain a hermetic seal compared to the seal bar dwell time required to form a hermetic seal using a fitment composed of only HDPE under the same pressure/temperature heat seal conditions and using the same multilayer films.

In an embodiment, dwell time 1 is from 25%, or 30% to 40%, or 50% less than dwell time 2 (in seconds).

In an embodiment, a fitment base consisting of only HDPE (base 2) has the same structure as the base of the fitment of the present disclosure. The base 2 HDPE has a density from 0.940 g/cc to 0.970 g/cc, a Tm greater than 125° C., and a melt index from 1 g/10 min to 50 g/10 min. In this embodiment, the process includes sealing the present base under a first set of dwell time and pressure heat seal conditions with a given type of multilayer films, hereafter referred to as condition 2. The process includes forming a hermetic seal at a temperature 1 wherein temperature 1 is less than the temperature required to form a hermetic seal between fitment base 2 and the multilayer films under condition 2 (hereafter temperature 2). In other words, under the same dwell time and pressure heat seal conditions and with the same type of multilayer films, use of the present fitment with the two-component polymeric composition requires a lower temperature to obtain a hermetic seal compared to the temperature required to form a hermetic seal using a fitment composed of only HDPE under the same pressure/dwell time heat seal conditions and using the same multilayer films.

6. FLEXIBLE CONTAINER

The process includes forming a flexible container. In an embodiment, the flexible container includes a first multilayer film and a second multilayer film, each multilayer film comprising a seal layer. The multilayer films are arranged such that the seal layers oppose each other and the second multilayer film is superimposed on the first multilayer film. The flexible container includes a fitment sandwiched between the first multilayer film and the second multilayer film, the fitment having a base. The fitment is composed of the polymeric composition. The polymeric composition includes (i) from 70 weight percent to 90 weight percent of a high density polyethylene (HDPE) having a density from 0.940 g/cc to 0.970 g/cc, a melt temperature, Tm, greater than 125° C., and a melt index from 1 g/10 min to 50 g/10 min, and (ii) from 30 weight percent to 10 weight percent of an olefin-based elastomer having a density from 0.858 g/cc to 0.905 g/cc and a Tm less than 125° C. The base is sealed to the first multilayer film and the second multilayer film.

Figure 4:
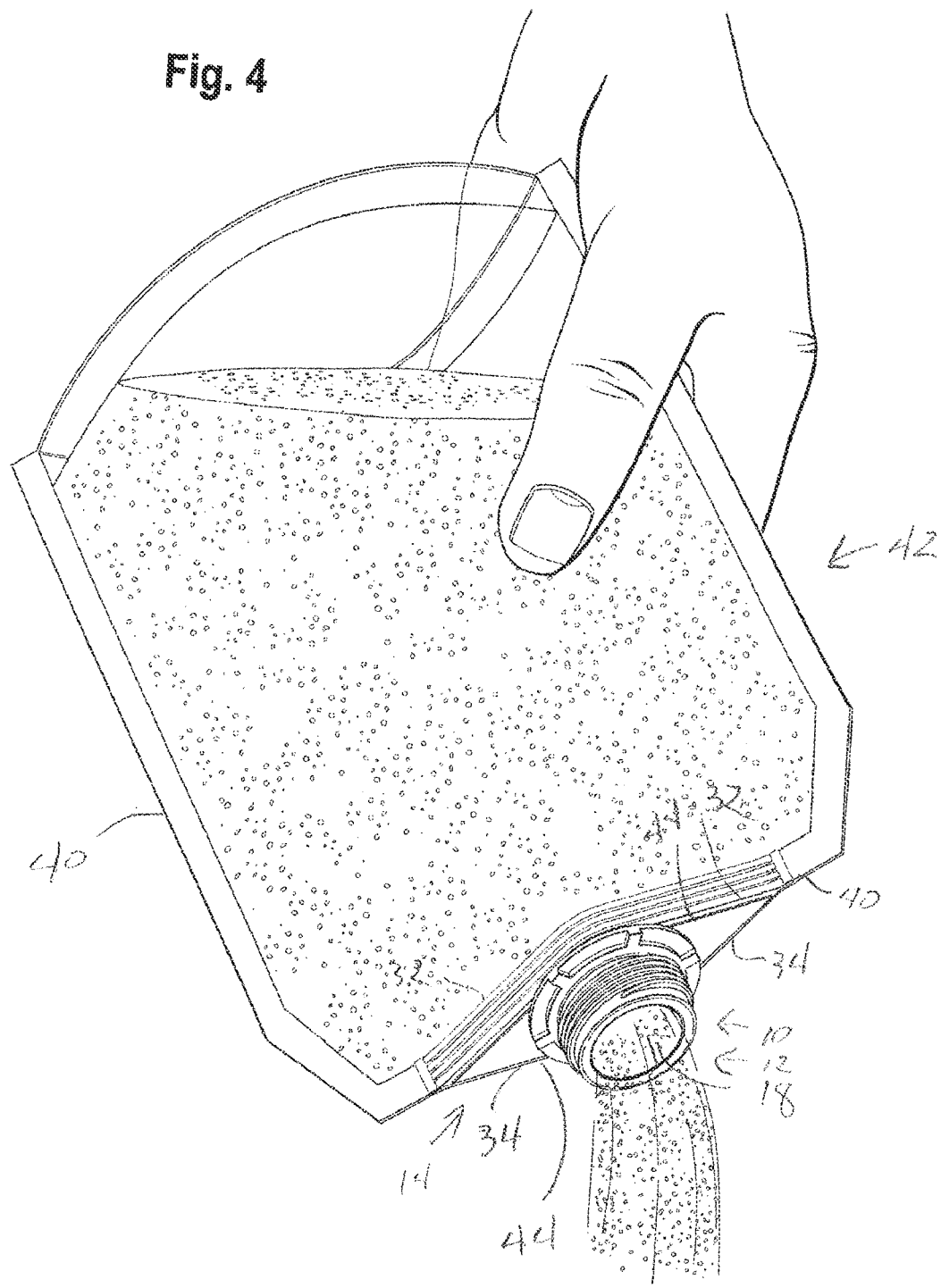
FIG. 4 is a perspective view of a flexible pouch in accordance with an embodiment of the present disclosure.

The opposing multilayer films 32, 34 are superimposed on each other and form a common peripheral edge 40 as shown in FIG. 4. The process includes sealing the multilayer films 32, 34 along the common peripheral edge and forming a flexible container 42. Formation of the seal along the common peripheral edge 40 can occur before, during or after, the heat sealing for the fitment. The process forms a hermetic seal 44 between the base 12 and the multilayer films 32 and 34. A hermetic seal indicates package integrity (no leaks in the seals). Hermiticity testing for enclosures made with such hermetic seals show no bubbles present in the test result.

By way of example, and not limitation, examples of the present disclosure are provided.

EXAMPLES

1. Materials

Materials for polymeric compositions for making fitments are provided in Table 1 below. The source for each product in Table 1 is The Dow Chemical Company.

TABLE 1

| Product name | Composition | Properties |
| --- | --- | --- |
| DMDA-1250 | HDPE | d 0.955 |
|  |  | MI 1.5 |
|  |  | Tm 130.0 |
| DMDA-1206 | HDPE | d 0.952 |
|  |  | MI 6.8 |
|  |  | Tm 131.1 |
| DMDA-1230 | HDPE | d 0.945 |
|  |  | MI 10 |
|  |  | Tm 127.8 |
| DMDA-8920 | HDPE | d 0.945 |
|  |  | MI 20 |
|  |  | Tm 130.0° C. |
| HDPE 17450N | HDPE | d 0.950 |
|  |  | MI 17 |
|  |  | Tm 127.8 |
| DMDC-1210 | HDPE | d 0.952 |
|  |  | MI 10 |
|  |  | Tm 130 |
| ENGAGE 8400 | Ethylene/octene copolymer | D 0.870 |
|  |  | MI 30 |
|  |  | Tm 65 |
| AFFINITY PT 1450G1 | Ethylene/octene copolymer | D 0.902 |
|  |  | MI 7.5 |
|  |  | Tm 98 |
| INFUSE 9807 | Ethylene/octene multi-block copolymer | d 0.866 |
|  |  | MI 15 |
|  |  | Tm 118 | d-density, g/cc
MI-melt index, g/10 min
Tm-melt temperature, ° C.

2. Fitment Assembly

Polymeric compositions made from the compositions in Table 1 are formed via a twin screw compounding apparatus. The polymeric compositions are then injection molded into fitments-using a 25 ton Toyo Injection Molding Machine, a canoe-base fitment type: 20-410 as shown in FIGS. 1 and 2.

HDPE DMDC-1210 is compounded with different olefin-based elastomers in order to lower melt temperature and improve seal performance: (i) 80% DMDC-1210/20% Engage 8400; (ii) 80% DMDC-1210/20% Infinity 9807; and (iii) 80% DMDC-1210/20% Affinity 1450.

TABLE 2

Summary of Mechanical and Physical Properties

| Test | Units | 80% DMDC-1210/20% Affinity PT 1450G1 | 80% DMDC-1210/20% Engage 8400 | 80% DMDC-1210/20% Infuse 9807 | DMDC-1210 | HDPE-17450N |
|---|---|---|---|---|---|---|
| Density | g/cm3 | 0.945 | 0.939 | 0.939 | 0.952 | 0.95 |
| Melt Index | g/10 min | 8.74 | 10.93 | 10.04 | 10.13 | 16.36 |
| Tm | ° C. | 130.15 | 130.84 | 130.98 | 129.65 | 128.36 |
| Heat of Fusion | J/g | 196.6 | 181.8 | 184.2 | 209.7 | 200.6 |
| Tc | ° C. | 119.21 | 119.9 | 120.35 | 116.82 | 114.2 |
| Flex Modulus | Mpa | 1295.32 | 1171.3 | 1102.4 | 1481.35 | 1274.65 |
| Secant Modulus at 1% | Mpa | 1026.61 | 909.48 | 875.03 | 1240.2 | 985.27 |
| Secant Modulus t 2% | Mpa | 861.25 | 757.9 | 730.34 | 1047.28 | 833.69 |
| Tensile Strain @ Yield | % | 9 | 9 | 9 | 10 | 11 |
| Tensile Stress @ Break | Mpa | 13.60 | 10.93 | 10.51 | 17.85 | 11.59 |
| Tensile Stress @ Yield | Mpa | 21.63 | 19.31 | 18.75 | 24.78 | 23.98 |
| Avg. Toughness | Nm | 16.38 | 95.02 | 5.31 | 40.56 | 10.17 |

A summary of the melt temperature, crystallization temperature, and heat of fusion is depicted in Table 2. All the DMDC-1210 samples compounded with Affinity 1450, Engage 8400, and Infuse 9807 show similar melt temperature as that of DMDC-1210 due to their similar densities. The heat of fusion for 80% DMDC-1210/20% Engage 8400 and 80% DMDC-1210/20% Infuse 9807 reflect the lowest values from the sample set. Lower heat of fusion energy correlates to the burst performance and hermiticity data at lower seal times as these resins exhibit the highest burst pressure and decrease seal time without affecting seal integrity. This shows that longer interfacial adhesion is achieved due to lower softening temperature. 80% DMDC-1210/20% Infuse 9807 shows the highest crystallization temperature while HDPE 17450N shows the lowest crystallization temperature.

3. Pouch Assembly

The fitments are sealed to a flexible pouch. Pouches are assembled on a Karlville spout inserting machine. Multilayer films with 3-layer construction of 12.5 micron PET/adhesive/76.4 micron ethylene-based polymer and flat dimensions of 12.7 cm (5")×17.8 cm (7") (hereafter Film1) are used to make the flexible pouches. The pouches and fitments are fed into the Karlville machine. The fitment is preheated and inserted inside the pouch. A suction cup tool is used to open the pouch for the fitment to be inserted. The preassembled pouch passes through a series of three heated clamping stations 176.7° C. (350° F.) to induce sealing between the fitment and the pouch. The last clamping station is a cooling station to cool down and recrystallize the fitment/pouch surface. The clamping pressure is set at 2.76 bar(40 psi) and kept as a constant during the assembly process.

The flexible pouch is made from two opposing multilayer films sealed along a common peripheral edge. Seal temperatures and seal times are lowered during the experiment to understand improvement in seal performance for the elastomer blends.

The blends created are benchmarked against DMDC-1210 and HDPE 17450N and tested for various properties including melt index, density, Tm, tensile strength, and flex modulus.

Figure 5:
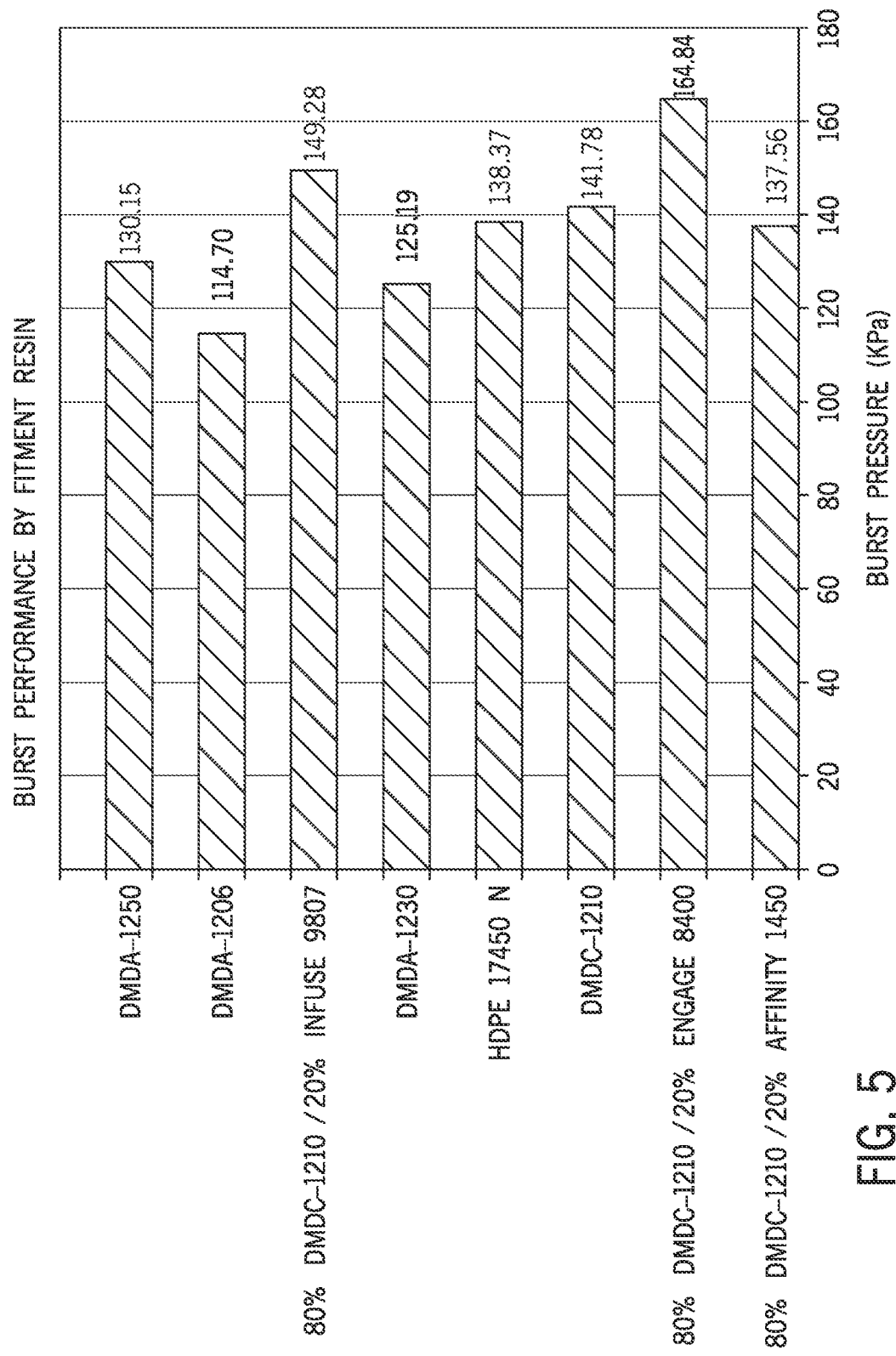
FIG. 5 is a graph showing burst strength by fitment resin composition.

HDPE 17450N is used as the control fitment resin due to its acceptability of seal performance in the market. Pouch assemblies that show lower than 117 kPa (1.15 bar, 17 psi) burst pressure are considered defective pouches as these will most likely fail in the field. Likewise, pouch assemblies that exhibit 138 kPa (1.36 bar, 20 psi) or higher burst pressure will be considered optimal performance in the field. As seen in FIG. 5, 80% DMDC-1210/20% Affinity 1450 and DMDC-1210 show equivalent performance to HDPE 17450N in the range of 138-142 kPa burst pressure.

80% DMDC-1210/20% Engage 8400, 80% DMDC-1210/20% Infuse 9807, and DMDC-1210 each exceed the burst performance compared to the burst performance of control HDPE 17450N, demonstrating improvement in seal performance. This achievement in seal performance achieved by 80% DMDC-1210/20% Engage 8400, 80% DMDC-1210/20% Infuse 9807 blends enables the lowering of heat seal temperatures and/or reducing dwell time in the pouch assembly process which would lead to lower energy consumption and faster cycle times.

4. Lower Temperature Burst Performance

Based on the successful data collected from the initial burst test, a second experiment is conducted in which clamp temperatures are lowered to 157° C. from 174° C. (345° F.).

Figure 6:
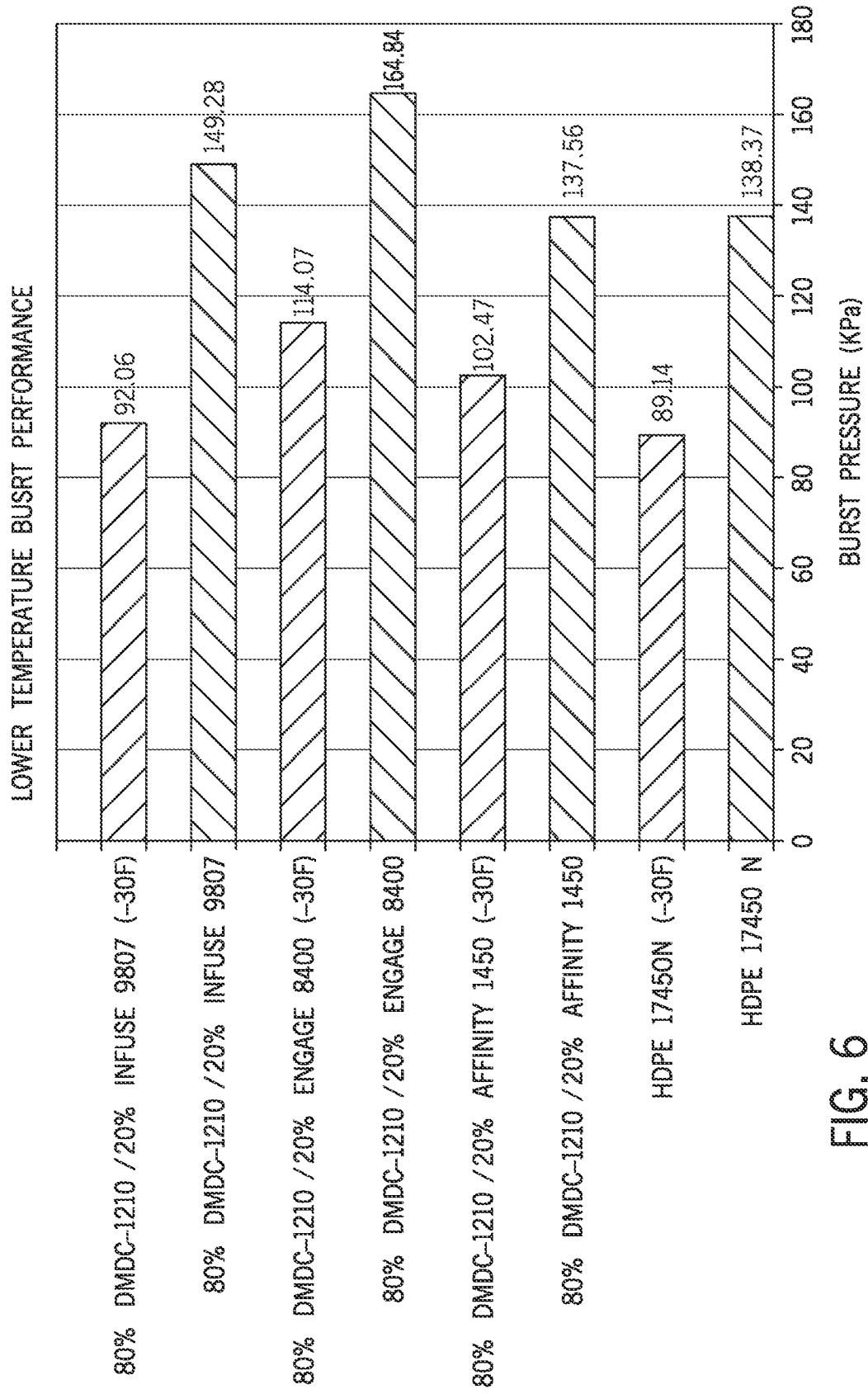
FIG. 6 is a graph showing burst strength by fitment resin composition.

Seal bar remained constant during the experiment at 276 kPa (2.7 bar, 40 psi). This test only focused on the composite resins as they showed higher or equivalent burst performance to control HDPE 17450N. FIG. 6 depicts the burst results at the lower clamp temperature 157° C. (315° F.) and control seal bar temperature 174° C. (345° F.) as a reference.

5. Hermiticity Test

Due to the burst performance achieved through the Infuse, Affinity and Engage blends, it is believed that a lower dwell (seal) time, hence faster cycle time could be achieved without affecting seal performance. Pouches/fitments are assembled and sealed at shorter dwell times while maintaining a constant seal bar temperature of 177° C. (350° F.) and pressure of 276 kPa (2.7 bar, 40 psi). Hermiticity is tested under 50.8 mmHg vacuum on a seal integrity tester. A minimum of 10 empty capped and sealed fitment/pouch assemblies are tested for comparative purposes. The bags are placed inside the tester tank filled with water and a vacuum is applied to create air pressure inside the empty pouch assembly. Pouch failure is determined if the seal around the fitment leaked which is visible by air escaping from the bag and creating bubbles in the water. FIG. 7 summarizes the hermiticity results for each blend evaluated at different seal times.

The colder seal bar temperature burst performance continues to follow the favorable trend where 80% DMDC-1210/20% Engage 8400 and 80% DMDC-1210/20% Infuse 9807 exceed burst performance of HDPE 17450N. In this particular test, HDPE composition of 80% DMDC-1210/20% Affinity 1450 also shows higher burst performance at colder seal bar temperatures than that of HDPE 17450N. The overall fitment melt temperature can be significantly lowered by the addition of olefin-based elastomer without significantly impacting the seal performance.

20% Infuse 9807 do not show 100% hermiticity failure until 0.4 seconds seal time. These results show that seal time (dwell time) can roughly be reduced by 20-50% by using 80% DMDC-1210/20% Engage 8400 and 80% DMDC-1210/20% Infuse 9807 resins as the fitment material. Reduction in seal time increases production efficiencies and minimizes energy consumption.

In particular, Table 3 shows much greater than 0.1 second improvement for Example 1 (Ex1), greater than 0.1 second improvement for Example 2, and 0.1 second improvement for Example 3. Example 1 only needs 0.5 seconds to achieve hermetic seal compared to control samples 1,2 (CS1, CS2) which require 0.8 seconds for hermetic seal. The present fitment with the two-component polymeric blend yields a 38% (0.3/0.8) reduction in dwell time for Example 1 compared to the control samples under the same temperate/pressure and heat seal conditions. The 38% reduction in dwell time translates to improvement in output rate with use of the present fitment in flexible containers compared to HDPE-only fitments under the same heat seal conditions.

6. Mechanical and Physical Properties

Mechanical and physical properties are measured on the five materials summarized in Table 2. DMDC-1210 blends with Affinity, Engage and Infuse materials are compared against control HDPE 17450N and DMDC-1210 resins. The density of DMDC-1210 drops with each elastomeric blend. 80% DMDC-1210 with 20% Affinity 1450 yields a higher density value compared to the other blends at 0.945 g/cc. Typically higher density materials are equivalent to higher heat deflection temperatures due to higher molecular weight content and higher barrier properties. These are important factors in acceptability of the pouch and its overall performance. It can be observed on the burst data test previously

TABLE 3

Percentage Seal Failure vs. Dwell Time Reduction

| Example | Dow PE/PET Film[+] Fitment Material | Percentage Seal Failure Dwell (seal) Time (sec) | | | | | Seal Cycle Improvement Dwell Time Improvement (sec) |
|---|---|---|---|---|---|---|---|
| | | 0.4 | 0.5 | 0.6 | 0.7 | 0.8 | |
| Ex1 | 80% DMDC-1210/20% Infuse 9807 | 100% | 4% | 8% | 0% | | >>0.1 |
| Ex2 | 80% DMDC-1210/20% Engage 8400 | 100% | 75% | 14% | 0% | | >0.1 |
| Ex3 | 80% DMDC-1210/20% Affinity 1450 | | 100% | 29% | 0% | | 0.1 |
| CS1* | DMDC-1210 | | 100% | 67% | 17% | 0% | Control Sample |
| CS2* | HDPE 17450N | | 100% | 83% | 12% | 0% | Control Sample |

*CS-comparative sample
[+]Film1

The control parameter for this test is set at 0.8 second dwell time where 0% pouch failure is noted for control resin HDPE 17450N. 100% pouch failure occurs at 0.5 second dwell time for control resin HDPE 17450N, DMDC-1210 and 80% DMDC-1210/20% Affinity 1450. Blends 80% DMDC-1210/20% Engage 8400, and 80% DMDC-1210/ described how the lower density blends shows higher burst performance, hence better sealability between fitment and pouch.

The overall DMDC-1210 melt index is also affected by the introduction of the elastomeric material in the blend. 80% DMDC-1210/20% Engage 8400 and 80% DMDC- 1210/20% Infuse 9807 blends show close melt index properties as virgin DMDC-1210. 80% DMDC-1210 with 20% Affinity 1450 shows a drop in melt index at 8.74 MI. For an injection molding process, an 8.74 MI is considered a processable resin as other existing caps and closure resins also fall within this range. The three blends, 80% DMDC-1210/20% Engage 8400, 80% DMDC-1210/20% Infuse 9807, and 80% DMDC-1210/20% Affinity 1450 are injection molded without an issue.

Table 2 also reflects flex modulus and tensile data for the resins evaluated. The flex modulus results are noticeably lower for the DMDC-1210 blends with Engage 8400 and Infuse 9807 compared to control HDPE 17450N and DMDC-1210. Tensile strength at yield and break also show the same pattern for these resins. This effect can also be noted on the higher burst strength performance of the blends with the Engage 8400 and Infuse 9807. Overall, the lower flex modulus and density of the Infuse 9807 and Engage 8400 blends depict a lower high molecular weight structure resin.

7. CONCLUSIONS

The blend of 80% DMDC-1210/20% Engage 8400 provides the optimum level of both processing and higher burst seal performance at 165 kPa (23.9 psi) compared to control HDPE 17450N at 138 kPa (1.36 bar, 20 psi). The blend of 80% DMDC-1210/20% Engage 8400 has a density of 0.939 g/cc and melt index of 10.93 g/10 min. The blend of 80% DMDC-1210/20% Infuse 9807 exhibits the second highest improved seal performance and shows the lowest flex modulus out of all three blends.

80% DMDC-1210/20% Affinity 1450 and DMDC-1210 show equivalent performance to HDPE 17450N in the range of 138-142 kPa burst pressure.

Reduced dwell time and hermiticity tests reveal 80% DMDC-1210/20% Engage 8400 and 80% DMDC-1210/20% Infuse 9807 each reduce dwell time by 20-50% before complete pouch failure. Utilization of these bonds will increase production rates and minimize total energy consumption.

Based on the evaluations conducted it can be concluded that the three blends created, 80% DMDC-1210/20% Infuse 9807, 80% DMDC-1210/20% Engage 8400 and 80% DMDC-1210/20% Affinity 1450 can deliver both acceptable processing characteristics in the injection molding process as well as improved seal performance enabling sealability within a desirable melt window of the pouch sealant layer.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A fitment comprising:
a top portion, a base, and a channel extending through the top portion and the base for passage of a flowable material;
the fitment composed of a polymeric composition that is a two-component blend of:
(i) from 70 to 90 weight percent of a high density polyethylene (HDPE) having a density from 0.940 g/cc to 0.970 g/cc, a melt temperature, Tm, greater than 125° C., and a melt index from 1 g/10 min to 50 g/10 min; and
(ii) from 30 to 10 weight percent of an olefin-based elastomer having a density from 0.860 g/cc to 0.905 g/cc, a melt index from 0.2 g/10 min to 50 g/10 min, and a Tm less than 125° C.;
(iii) the two-component blend having
(a) a density from 0.930 g/cc to 0.945 g/cc, and
(b) a melt temperature from 127° C. to 131° C.;
the base comprising a pair of opposing sidewalls defining a canoe-shape when the fitment is viewed from a bottom plan view;
the sidewalls extending around opposite sides of the channel and join together to form opposing ends; and
each end is parallel to the channel.

2. The fitment of claim 1 wherein
each end of the opposing sidewalls has an edge; and
each edge is parallel to the channel.

3. The fitment of claim 2 comprising
a plurality of sealing ribs extending along the sidewalls.

4. The fitment of claim 3 wherein
each of the plurality of the sealing ribs is perpendicular to the edge of each end.

5. The fitment of claim 4 wherein
each edge is a radialmost distance from the channel when the fitment is viewed from a bottom plan view.

6. The fitment of claim 5 wherein the channel has a diameter; and
the channel diameter is the same in the top portion as the channel diameter in the base.

7. The fitment of claim 6 wherein the two-component blend has a density from 0.939 g/cc to 0.945 g/cc.

8. The fitment of claim 7 wherein the two-component blend has a melt temperature from 130.15° C. to 130.98° C.

9. A flexible container comprising:
a first multilayer film and a second multilayer film, each multilayer film comprising a seal layer, the multilayer films arranged such that the seal layers oppose each other and the second multilayer film is superimposed on the first multilayer film;
a fitment sandwiched between the first multilayer film and the second multilayer film, the fitment comprising of a top portion, a base, and a channel extending through the top portion and the base, the fitment composed of a polymeric composition that is a two-component blend of
(i) from 70 weight percent to 90 weight percent of a high density polyethylene (HDPE) having a density from 0.940 g/cc to 0.970 g/cc, a melt temperature, Tm, greater than 125° C., and a melt index from 1 g/10 min to 50 g/10 min; and
(ii) from 10 weight percent to 30 weight percent of an olefin-based elastomer having a density from 0.860 g/cc to 0.905 g/cc and a Tm less than 125° C.;
(iii) the two-component blend having
(a) a density from 0.930 g/cc to 0.945 g/cc, and
(b) a melt temperature from 127° C. to 131° C.;
the base comprising a pair of opposing sidewalls defining a canoe-shape when the fitment is viewed from a bottom plan view;
the sidewalls extending around opposite sides of the channel and join together to form opposing ends;
each end is parallel to the channel; and
the base is sealed to the first multilayer film and the second multilayer film.

10. The fitment of claim 9 wherein
each end of the opposing sidewalls has an edge; and
each edge is parallel to the channel.

11. The fitment of claim 10 comprising
a plurality of sealing ribs extending along the sidewalls; and
the plurality of sealing ribs are sealed to the first multilayer film and the second multilayer film.

12. The fitment of claim 11 wherein
each of the plurality of the sealing ribs is perpendicular to the edge of each end.

13. The fitment of claim 12 wherein
each edge is a radialmost distance from the channel when the fitment is viewed from a bottom plan view.

14. The fitment of claim 13 wherein the channel has a diameter; and
the channel diameter is the same in the top portion as the channel diameter in the base.

15. The fitment of claim 14 wherein the two-component blend has a density from 0.939 g/cc to 0.945 g/cc.

16. The fitment of claim 15 wherein the two-component blend has a melt temperature from 130.15° C. to 130.98° C.

\* \* \* \* \*